United States Patent
Tohdoh et al.

(10) Patent No.: US 8,628,094 B2
(45) Date of Patent: Jan. 14, 2014

(54) METAL SEAL

(75) Inventors: Satoshi Tohdoh, Arida (JP); Takahiro Kariya, Arida (JP)

(73) Assignee: Mitsubishi Cable Industries, Ltd., Tokyo (JP)

( * ) Notice: Subject to any disclaimer, the term of this patent is extended or adjusted under 35 U.S.C. 154(b) by 474 days.

(21) Appl. No.: 12/725,671

(22) Filed: Mar. 17, 2010

(65) Prior Publication Data
US 2010/0253010 A1 Oct. 7, 2010

(30) Foreign Application Priority Data
Apr. 6, 2009 (JP) .................................. 2009-92232

(51) Int. Cl.
F16J 15/02 (2006.01)
F16L 17/00 (2006.01)

(52) U.S. Cl.
USPC .......................................... 277/644; 277/626

(58) Field of Classification Search
USPC ........................... 277/608, 609, 626, 644, 649
See application file for complete search history.

(56) References Cited

U.S. PATENT DOCUMENTS

| | | | | | |
|---|---|---|---|---|---|
| 3,163,431 | A | * | 12/1964 | Tanner | 277/381 |
| 3,171,662 | A | * | 3/1965 | Warn et al. | 277/644 |
| 3,602,532 | A | * | 8/1971 | Ehrenberg | 285/364 |
| 4,813,692 | A | * | 3/1989 | Halling et al. | 277/626 |
| 6,619,668 | B1 | * | 9/2003 | Pyre | 277/644 |
| 7,004,479 | B2 | * | 2/2006 | Oida et al. | 277/644 |
| 7,077,611 | B2 | * | 7/2006 | Metschke | 411/371.1 |
| 7,083,171 | B2 | * | 8/2006 | Oida et al. | 277/644 |
| 7,811,039 | B2 | * | 10/2010 | Nomichi et al. | 411/542 |

FOREIGN PATENT DOCUMENTS

JP 4091373 B2 3/2008

* cited by examiner

*Primary Examiner* — Vishal Patel
*Assistant Examiner* — Nicholas L Foster
(74) *Attorney, Agent, or Firm* — Kratz, Quintos & Hanson, LLP

(57) ABSTRACT

A metal seal to improve sealing function by increasing contact pressure under a final assembly state with keeping low fastening force. A metal seal of block shape has a first contact convex portion, a middle base portion, and a second contact convex portion. The first contact convex portion and the second contact convex portion are quarter-circular.

5 Claims, 6 Drawing Sheets

METAL SEAL

BACKGROUND OF THE INVENTION

1. Field of the Invention

This invention relates to a metal seal, especially, a metal seal disposed between a pair of flat faces as to perform sealing function with torsional deformation.

2. Description of the Related Art

Conventionally, metal seals are often used under harsh conditions such as high vacuum and high pressure (outer and inner pressure), high temperature and low temperature, or sealing corrosive fluid, etc.

So the inventors of the present invention had proposed a metal seal having a configuration (construction) shown in FIG. 6 and FIG. 7, which is disposed between a pair of flat faces to perform sealing function with torsional deformation as described above with small fastening force and high recovering force (refer to Japanese patent No. 4091373, for example).

A conventional metal seal 30 shown in FIG. 6 and FIG. 7, in which torsional elastic deformation is generated, is disposed between a pair of mutually parallel flat faces 31 and 32, and of which cross-sectional configuration is a block type having a rectangular middle base portion 33 and half-circular contact convex portions 34 and 35. The material is metal such as SUS, and the metal seal is constructed as that the half-circular contact convex portions 34 and 35 are pressed to the pair of flat faces 31 and 32 with a predetermined pressure distribution 36 to perform fluid sealing function in a final approaching state (final assembly state) with torsional elastic deformation shown in FIG. 7 in which the flat faces 31 and 32 in a free state (unattached state) shown in FIG. 6 are made mutually come close as shown in FIG. 7.

As clearly shown in FIG. 7, the half-circular contact convex portions 34 and 35 have maximum pressure $P_0$ in contact with the flat faces 31 and 32, rather large contact arc length $C_0$, and the pressure distribution 36 of relatively gentle hill shape.

The conventional metal seal 30 as described above, although having an advantage that the flat faces 31 and 32 as corresponding faces are not damaged, leaves following problems. That is to say, (i) the flat faces 31 and 32 are necessary to be mirror-finished, (ii) the contact convex portions 34 and 35 of the metal seal 30 are necessary to be finished with super polishing, and (iii) sealability is rather insufficient for sealing gas, can be pointed out.

It is therefore an object of the present invention to provide a metal seal with which the above mentioned problems (i) (ii) (iii) are resolved with a simple configuration, and strict quality control of sealing face portions such as the mirror finish and the super polishing finish on the corresponding faces (flat faces) and the metal seal itself can be omitted to facilitate the production and lower the cost. And, it is another object to improve the sealability further.

BRIEF DESCRIPTION OF THE DRAWINGS

The present invention will be described with reference to the accompanying drawings in which.

DESCRIPTION OF THE PREFERRED EMBODIMENTS

Preferred embodiments of the present invention will now be described with reference to the accompanying drawings.

Figure 1:
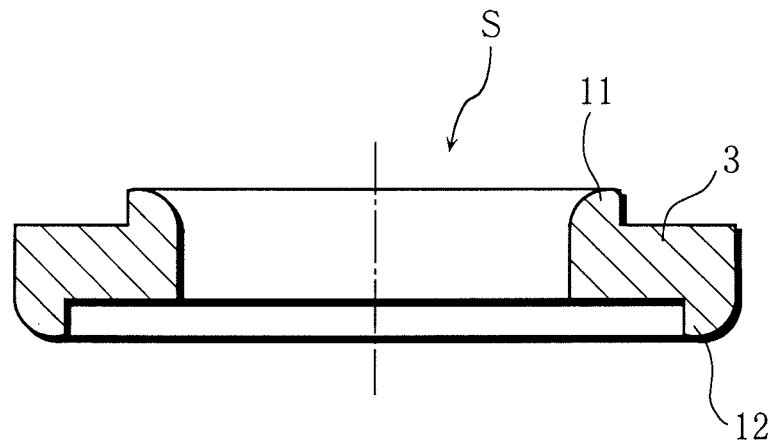
FIG. 1 is a cross-sectional front view showing an embodiment of the present invention.
Figure 3:
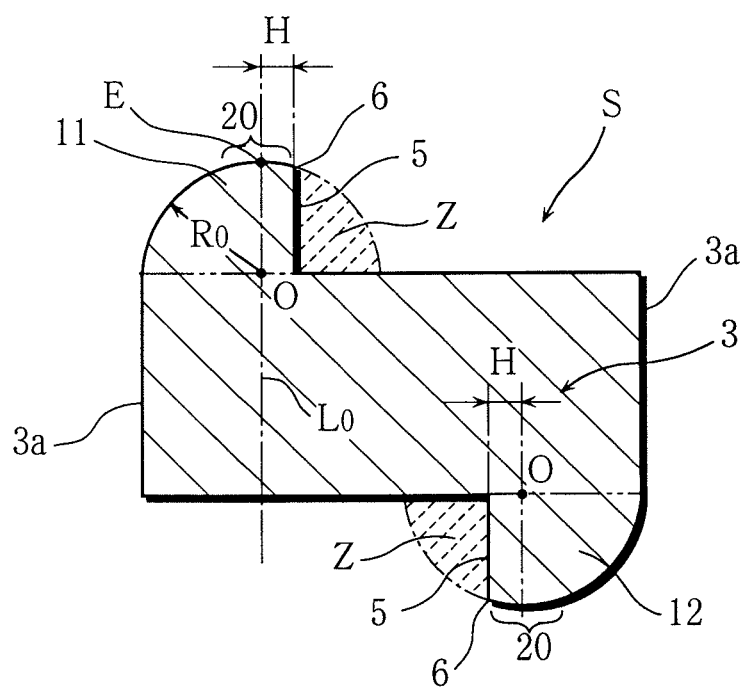
FIG. 3 is an enlarged cross-sectional view of a principal portion showing a free state.
Figure 4:
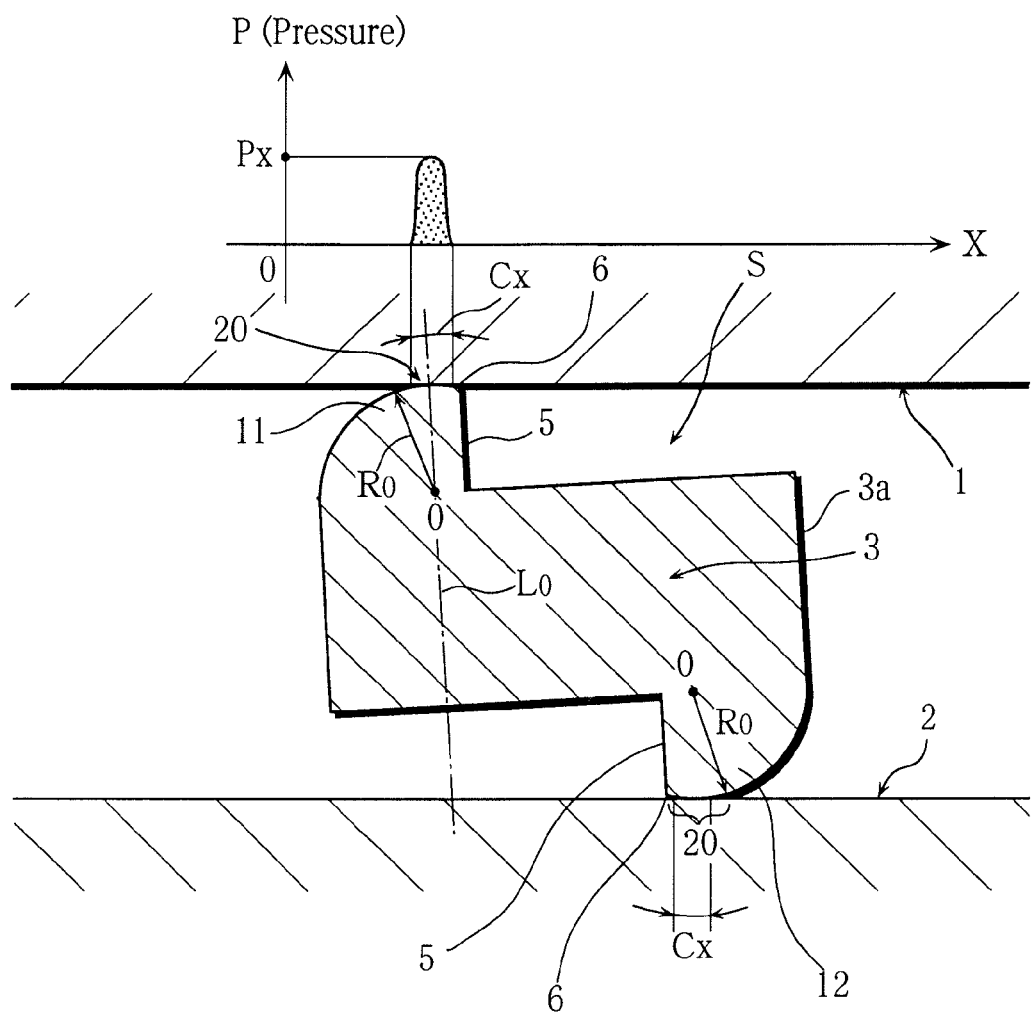
FIG. 4 is an enlarged explanatory cross-sectional view of a principal portion of a halfway contact state in which a pair of flat faces gradually come closer.
Figure 5:
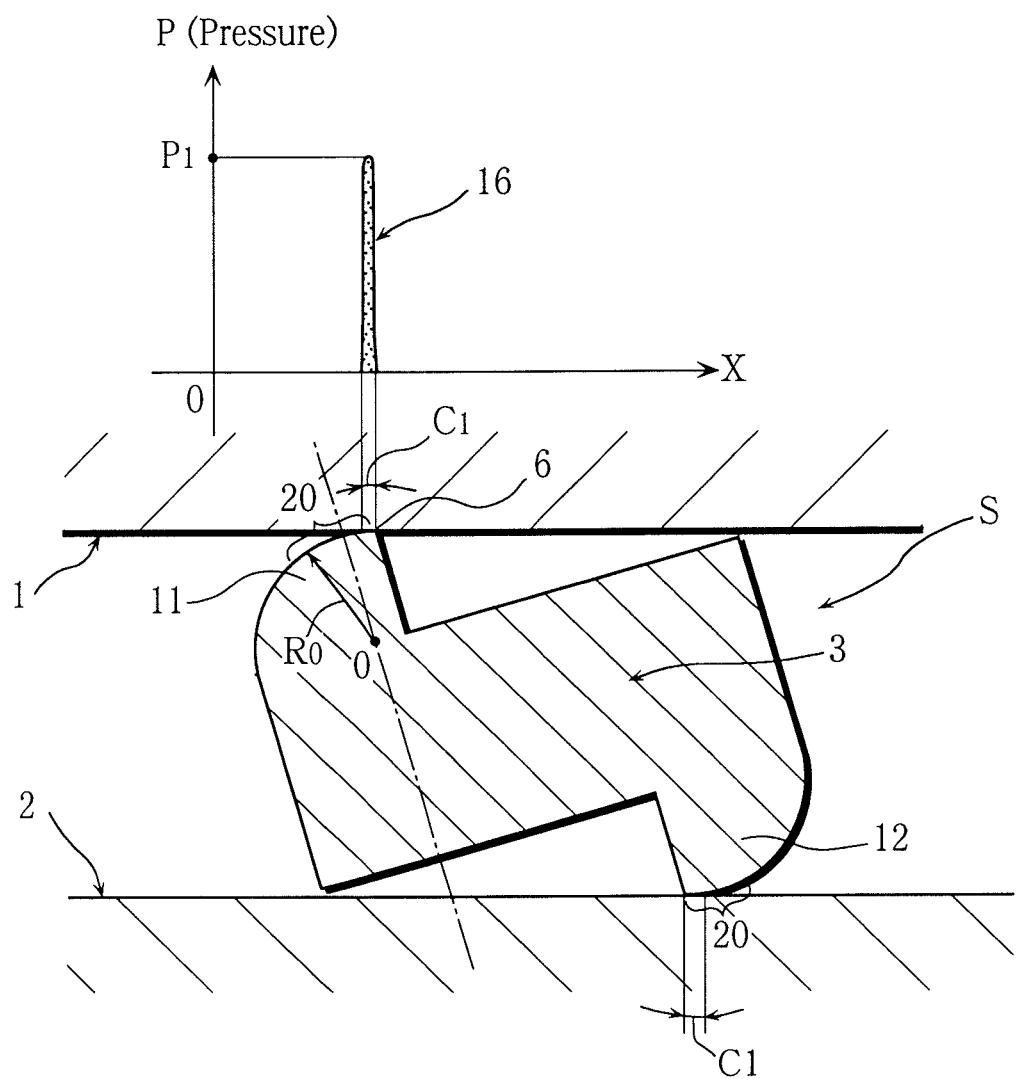
FIG. 5 is an enlarged explanatory cross-sectional view of a principal portion of a final approaching state.

FIGS. 1 and 3, cross-sectional front views in a free state (unattached state), show an embodiment of a metal seal S. FIGS. 4 and 5 show used state. FIG. 4 shows an explanatory view of a halfway contact state, and FIG. 5 shows an explanatory view of a final approaching state.

Various kinds of corrosive gas are used in semiconductor production. The metal seal S of the present invention is appropriate for piping system of semiconductor production apparatuses, and the material of the metal seal is preferably anti-corrosive metal such as SUS316L without face covering layers (coating layers).

And, the metal seal S is disposed between a pair of mutually parallel flat faces 1 and 2 to seal with generation of torsional elastic deformation, and having a block type cross-sectional configuration.

To explain the cross-sectional configuration further in detail, the cross-sectional configuration has an approximately rectangular middle base portion 3, a first contact convex portion 11 to contact the flat face 1 on one side, and a second contact convex portion 12 to contact the flat face 2 on the other side unitedly in a block shape. The first contact convex portion 11 protrudes on an inner side of the middle base portion 3, and the second contact convex portion 12 protrudes on an outer side of the middle base portion 3.

To explain the cross-sectional configuration of the first contact convex portion 11, the first contact convex portion 11 has a direct contact portion 20 in a halfway contact state in which the pair of flat faces 1 and 2 (in an attached and unpressurized state not shown in Figures) are on halfway of gradual approach as shown in FIG. 4, and the direct contact portion 20 is arc-shaped having a sufficiently large radius $R_0$.

And, when a halfway contact arc length within the direct contact portion 20 is Cx (refer to FIG. 2 and FIG. 4) and a final assembly contact arc length in final approaching state is $C_1$ (refer to FIG. 2 and FIG. 5) on halfway of gradual approach of the pair of flat faces 1 and 2, an escape portion Z is formed with cutting on the final end side of the direct contact portion 20 as to make $C_1 < Cx$.

And, it is preferable to form an R-shaped chamfer of small radius $R_1$ on a corner portion (edge portion) 6 between a cutting line 5 for forming the escape portion Z and the direct contact portion 20. That is to say, the flat face 1 is prevented from being damaged.

As described above, maximum pressure $P_1$ in the final approaching state (final assembly state) can be sufficiently larger (higher) than maximum pressure Px in the halfway contact state shown in FIG. 4 by setting $C_1 < Cx$, and outer leak of fluid, especially gas (gaseous fluid) is prevented and high sealability (tight-seal function) is realized thereby.

Figure 7:
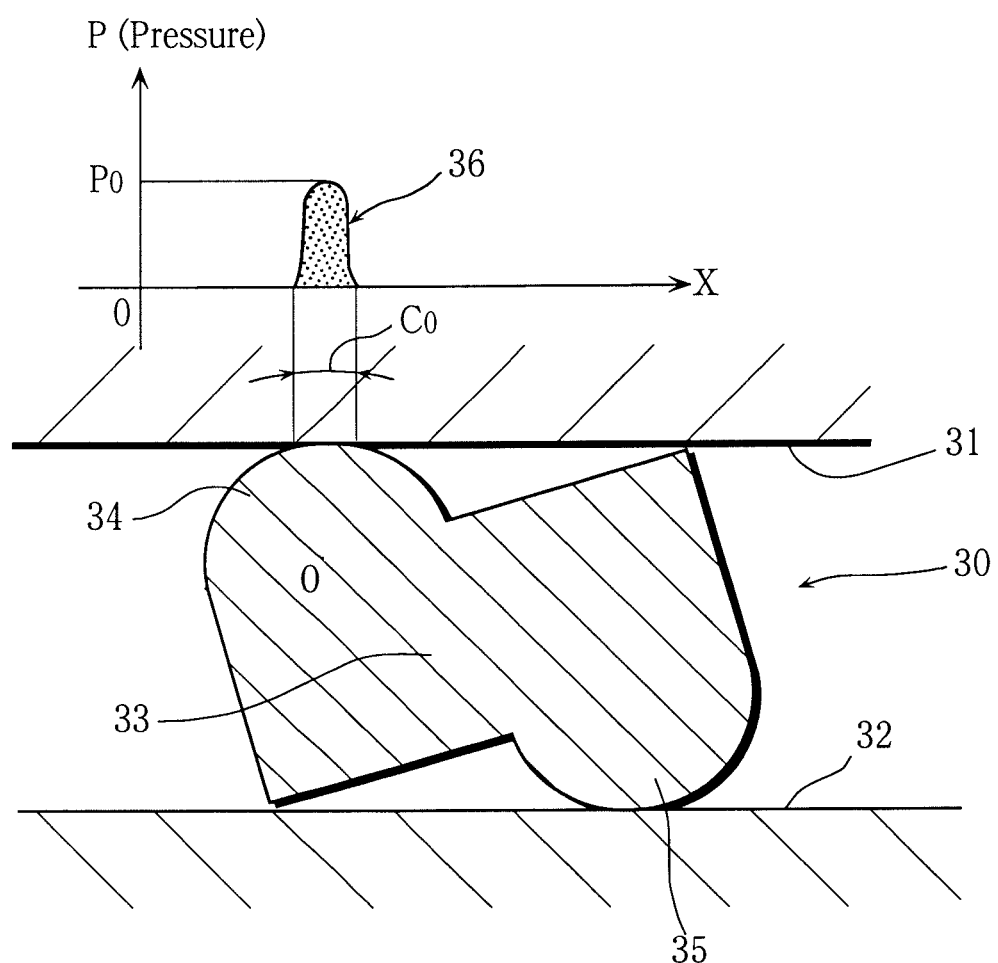
FIG. 7 is an enlarged explanatory cross-sectional view of a principal portion of a final approaching state of the conventional example.

Especially, it is preferable to set $0.3 \cdot Cx \leq C_1 \leq 0.6 \cdot Cx$. As shown in FIG. 7, the contact arc length $C_0$, when the escape portion Z formed by cutting is omitted, is approximately same as (although slightly larger than) the halfway contact arc length Cx. So a relational expression $0.3 \cdot C_0 \le C_1 \le 0.6 \cdot C_0$ is also fulfilled.

Next, to explain the second contact convex portion 12, the second contact convex portion 12 (from the attached and unpressurized state not shown in Figures) to the halfway approaching state in FIG. 4 has a direct contact portion 20 to contact the flat face 2, the direct contact portion 20 is arc-shaped having a sufficiently large radius $R_0$, and a relational expression $0.3 \cdot Cx \le C_1 \le 0.6 \cdot Cx$ is fulfilled between the halfway contact arc length Cx and the final assembly contact arc length $C_1$. And, it is similar to the first contact convex portion 11 that an R-shaped chamfer of small radius $R_1$ is formed on a corner portion 6 between a cutting line 5 for forming the escape portion Z and the direct contact portion 20 (refer to FIG. 2).

Figure 2:
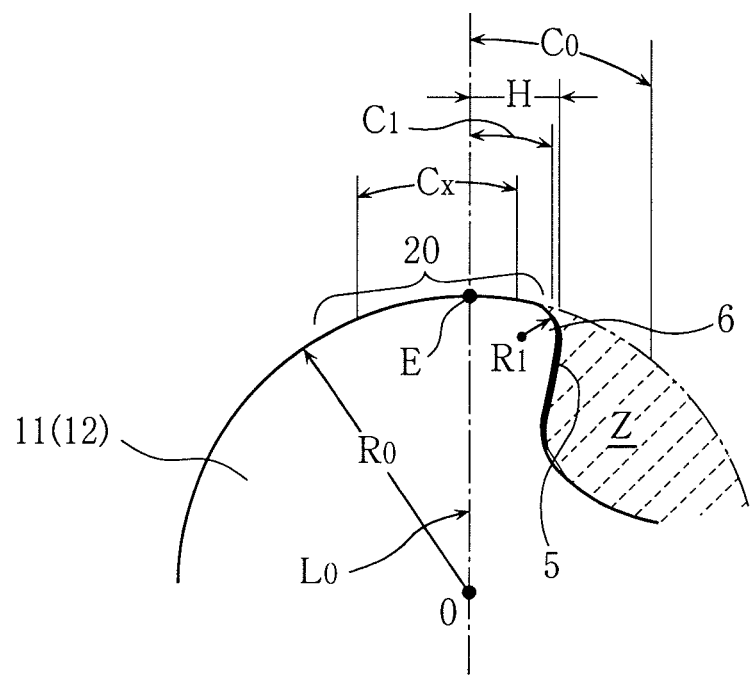
FIG. 2 is an explanatory view of a basic construction of the present invention.

And, the relationship and function of the maximum pressure Px in the halfway contact state and the maximum pressure $P_1$ in the final approaching state of the second contact convex portion 12 are also similar to that of the above-described first contact convex portion 11, and explanation of these is omitted (refer to the schematic construction view in FIG. 2 and the pressure graphs in FIG. 4 and FIG. 5).

And, in the embodiment shown in FIG. 1 and FIGS. 3 through 5, each of the first contact convex portion 11 and the second contact convex portion 12 of the metal seal S is formed as to have an approximately quarter-circular cross section. The escape portion (cutaway portion) Z is approximately quarter-circular slightly smaller than the cross-sectional area of the first contact convex portion 11 and the second contact convex portion 12.

Figure 6:
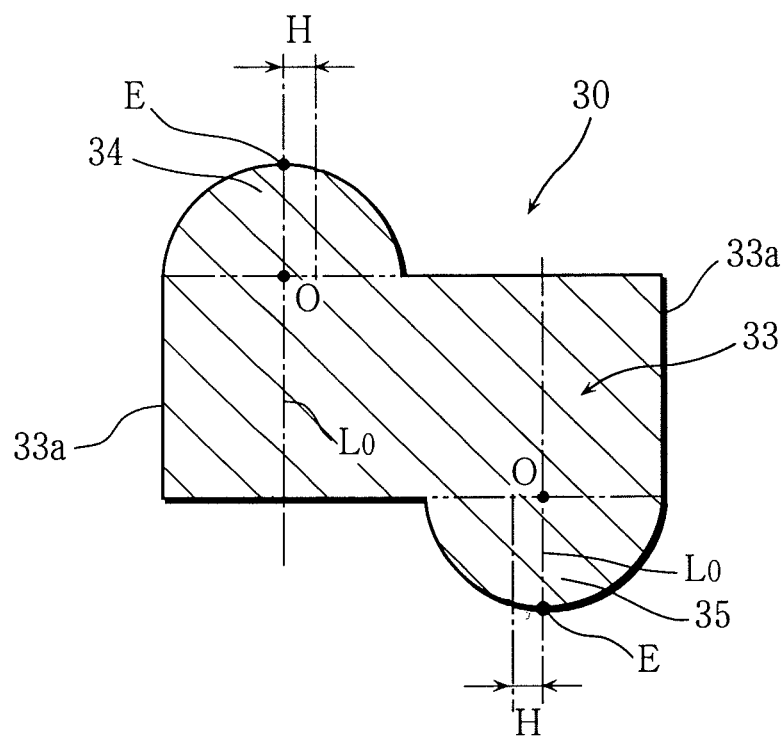
FIG. 6 is an enlarged cross-sectional view of a principal portion of a conventional example.

Concretely, to explain with conventional FIG. 6 as a basic configuration before cutting, a straight line $L_0$ is drawn through each of the centers 0 of the half-circular contact convex portions 34 and 35 and parallel to a short side 33a (3a) of the middle base portion 33 (3), and cutting is conducted parallel to the short side 33a (3a) on a position inner to an intersection point E of the straight line $L_0$ with the contact convex portion 34 or 35 (11 or 12) for a small dimension H.

The cutting line 5 of the escape portion Z formed by cutting is shown as to be composed with two lines crossing at right angles in FIG. 1 and FIGS. 3 through 5. In the present invention, although the configuration of the cutting line 5 may be formed into a curved line as shown in FIG. 2 or other configurations, it is sufficient to make the cutting line 5 of the escape portion Z not contact the flat faces 1 and 2 in the final approaching state. Especially, FIG. 2 shows that the contact arc length $C_0$ without cut escape portion in the final approaching state (of FIG. 6) becomes the sufficiently short arc length $C_1$ for the escape portion Z formed by the cutting line 5.

As described above, in the present invention, final assembly contact arc length $C_1$ becomes sufficiently smaller than the halfway contact arc length Cx and the contact arc length $C_0$ of the conventional example (in FIG. 6 and FIG. 7), the contact area with the flat faces 1 and 2 is reduced, the final assembly pressure distribution 16 in the final approaching state becomes remarkably sharp (in comparison with that of FIG. 7 and FIG. 4) as shown in FIG. 5, and the maximum pressure $P_1$ becomes remarkably high in comparison with the maximum pressure $P_0$ in FIG. 7 and the maximum pressure Px in the halfway contact state. That is to say, a line contact state is made.

As described above, despite the low fastening force for fastening the flat face 1 and the flat face 2 in the approaching directions, the maximum pressure $P_1$ rises (increases) as to improve the sealability (tight-seal function).

And, along the maximum pressure $P_1$ is increased and sufficient sealability (tight-seal function) is obtained as described above, the pair of flat faces 1 and 2 can be machine-worked faces of non-mirror finished state in the present invention. Further, conventional super polishing finish can be omitted and ordinary polishing finish is sufficient for the direct contact portions 20 of the convex portions 11 and 12 of the metal seal S. That is to say, even if finishing work on the sealing face portions on the both sides varies, the metal seal shows good sealability (tight-seal function) equal to that of the conventional metal seal with mirror finish and super polishing finish in helium sealing test. The covering layer (coating layer) on the surface of the metal seal S can also be omitted.

The present invention, not restricted to the embodiment described above, may be freely modified. For example, the middle base portion 3 may be a parallelogram, other polygons, and round configurations other than the rectangular configuration. And, the configurations of the convex portions 11 and 12 may be freely modified to other than the configurations shown in Figures as long as the direct contact portions 20 is arc-shaped and smoothly moving on the flat faces 1 and 2 along with the approach.

In the present invention as described above, despite the simple configuration, the maximum contact pressure $P_1$ becomes sufficiently high in the final approaching state, flow of outer leak is cut even if the sealed fluid is gas (gaseous fluid), and excellent sealability (tight-seal function) is achieved because the metal seal, having the block-shaped cross-sectional configuration disposed between the pair of mutually parallel flat faces 1 and 2 to generate torsional elastic deformation, provided with the middle base portion 3, the first contact convex portion 11 which contacts one of the flat faces 1 and 2, the second contact convex portion 12 which contacts the other of the flat faces 1 and 2, in which the first contact convex portion 11 protrudes from an inner side of the middle base portion 3 and the second contact convex portion 12 protrudes from an outer side of the middle base portion 3, is constructed as that the cross-sectional configuration of the direct contact portion 20, on which the first contact convex portion 11 and the second contact convex portion 12 directly contact the flat faces 1 and 2, is arc-shaped, and the escape portion Z is formed by cutting on the final end side of the direct contact portion 20 as the final assembly contact arc length $C_1$ in the final approaching state is smaller than the halfway contact arc length Cx within the direct contact portion 20 on halfway of gradual approach of the pair of flat faces 1 and 2. And, low fastening force is sufficient. And, mirror finish on the flat faces 1 and 2 as corresponding faces and super polishing finish on the contact convex portions 11 and 12 of the metal seal itself can be omitted because the maximum contact pressure $P_1$ is made sufficiently high. Production is made easy with low cost thereby.

And, only cutting work of the simple escape portion Z having approximately half-circular cross section is required to make the production easy because each of the first contact convex portion 11 and the second contact convex portion 12 has an approximately quarter-circular cross-sectional configuration.

And, conventional mirror finish of the flat faces 1 and 2 can be omitted to produce the corresponding faces easily with low cost because the flat faces 1 and 2 are machine-worked faces in non-mirror state.

While preferred embodiments of the present invention have been described in this specification, it is to be understood that the invention is illustrative and not restrictive, because various changes are possible within the spirit and indispensable features.

What is claimed is:

1. A metal seal to be used between a pair of mutually parallel flat faces, the metal seal being generally ring-shaped and having a cross-section taken on a plane including an axis of the metal seal, the cross section comprising:
a block-shaped rectangular middle base portion disposed between the pair of mutually parallel flat faces to generate torsional elastic deformation of the metal seal,
a first contact convex portion which protrudes from an inner side of the rectangular middle base portion and which contacts one of the flat faces, and
a second contact convex portion which protrudes from an outer side of the rectangular middle base portion and which contacts the other of the flat faces, wherein:
the first contact convex portion and the second contact convex portions are each respectively attached to an opposite axial face of the rectangular middle base portion, having each an approximately quarter circular cross-section, one having an arcuate surface of constant radius extending from the inner circumferential face of the rectangular base portion and extending over ninety degrees, and the other having an arcuate surface of constant radius extending from the outer circumferential face of the rectangular middle portion base and extending over ninety degrees;
each of the first contact convex portion and the second contact convex portion comprises a respective arc of contact against the flat faces, each arc of contact being a portion of a respective arcuate line defined by a respective center point located on a respective side of the rectangular middle base portion;
each arc of contact is bordered on a first end by an initial contact point at which the flat faces first make contact with the metal seal while approaching the metal seal, and each arc of contact is bordered on a second end by a cutaway at which the arc of contact vanishes;
a first distance from the first end of the arc of contact to the cutaway is less than a second distance from the first end to a point along the arcuate line which the flat faces would touch, if the arc of contact were continued along the arcuate line into a region of the cutaway; and wherein the metal seal contacts the flat faces only through the first distance in a final approaching state.

2. The rotation shaft seal as set forth in claim 1, wherein the flat faces are machine-worked faces worked to a non-mirror finish.

3. The metal seal as set forth in claim 1, wherein the final approaching state comprises contact of a corner of the block-shaped rectangular middle base portion with a respective one of the flat faces.

4. The metal seal as set forth in claim 1, wherein the first contact convex portion and the second contact convex portion are disposed on the block-shaped rectangular middle base portion at different respective radii of the ring shape in positions to generate the torsional elastic deformation of the metal seal between the pair of mutually parallel flat faces in the final approaching state.

5. A seal assembly comprising the metal seal as set forth in claim 1, and the pair of mutually parallel flat faces.

\* \* \* \* \*